(12) United States Patent
Storm et al.

(10) Patent No.: US 7,057,303 B2
(45) Date of Patent: Jun. 6, 2006

(54) VEHICLE MOUNTED ELECTRICAL GENERATOR SYSTEM

(75) Inventors: John M. Storm, Indianapolis, IN (US);
Nathan D. Pugh, Indianapolis, IN (US)

(73) Assignee: Contour Hardening, Inc., Indianapolis, IN (US)

( * ) Notice: Subject to any disclaimer, the term of this patent is extended or adjusted under 35 U.S.C. 154(b) by 0 days.

(21) Appl. No.: 11/262,684

(22) Filed: Oct. 31, 2005

(65) Prior Publication Data

US 2006/0049638 A1  Mar. 9, 2006

Related U.S. Application Data

(62) Division of application No. 10/783,266, filed on Feb. 20, 2004, now Pat. No. 6,979,913.

(51) Int. Cl.
*B60L 11/02* (2006.01)
(52) U.S. Cl. ............... 290/1 A; 290/1 C; 180/65.2
(58) Field of Classification Search ............ 290/1 A, 290/1 C, 45; 180/65.2, 65.4; 123/331, 333
See application file for complete search history.

(56) References Cited

U.S. PATENT DOCUMENTS

| | | | | |
|---|---|---|---|---|
| 1,481,405 | A * | 1/1924 | Anglada ................... | 180/57 |
| 2,612,249 | A | 9/1952 | Horn | |
| 2,898,542 | A * | 8/1959 | Cholick et al. ........... | 322/90 |
| 3,883,794 | A | 5/1975 | Sivley | |
| 3,927,728 | A | 12/1975 | Reime | |
| 4,039,037 | A * | 8/1977 | Vin ........................ | 180/24.11 |
| 4,186,312 | A | 1/1980 | Dvorak | |
| 4,310,768 | A | 1/1982 | Colley | |
| 4,405,029 | A * | 9/1983 | Hunt ...................... | 180/65.2 |
| 4,690,238 | A * | 9/1987 | von Sivers et al. ........ | 180/248 |
| 4,709,778 | A * | 12/1987 | von Sivers ............... | 180/292 |
| 5,068,591 | A | 11/1991 | Hoegberg et al. | |
| 5,287,939 | A | 2/1994 | Fernandez | |
| 5,563,802 | A | 10/1996 | Plahn et al. | |
| 5,609,219 | A * | 3/1997 | Watson et al. ............ | 180/248 |
| 5,847,470 | A * | 12/1998 | Mitchell .................. | 290/45 |
| 5,993,350 | A * | 11/1999 | Lawrie et al. ............ | 477/5 |
| 6,018,198 | A * | 1/2000 | Tsuzuki et al. ........... | 290/17 |
| 6,157,175 | A | 12/2000 | Morinigo et al. | |
| 6,170,587 | B1 * | 1/2001 | Bullock .................. | 180/69.6 |
| 6,175,217 | B1 | 1/2001 | Da Ponte et al. | |
| 6,328,122 | B1 * | 12/2001 | Yamada et al. ........... | 180/65.3 |
| 6,335,573 | B1 * | 1/2002 | Eguchi et al. ............ | 290/40 C |
| 6,345,674 | B1 * | 2/2002 | Easton ................... | 180/6.44 |
| 6,394,206 | B1 | 5/2002 | Fury | |
| 6,394,215 | B1 * | 5/2002 | Masuda .................. | 180/232 |
| 6,554,088 | B1 * | 4/2003 | Severinsky et al. ........ | 180/65.2 |

(Continued)

OTHER PUBLICATIONS

AuraGen Induction Power Source Catalog, Aura Systems, Jan. 17, 2003, Section 1.

(Continued)

*Primary Examiner*—Nicholas Ponomarenko
(74) *Attorney, Agent, or Firm*—Woodard, Emhardt, Moriarty, McNett & Henry LLP (57) ABSTRACT

A vehicle mounted AC generator system having an AC generator mounted outside the engine/transmission compartment and connected by drive shaft with universal joints and a belt driven RPM ratio device. The ratio is set to provide accurate AC generator RPM at a preselected engine RPM. The AC generator is mechanically engageable when certain conditions are met and is disconnected when other conditions are present, including an operator emergency stop switch.

13 Claims, 8 Drawing Sheets

U.S. PATENT DOCUMENTS

| | | | |
|---|---|---|---|
| 6,622,505 B1* | 9/2003 | Anderson et al. | 62/228.3 |
| 6,644,428 B1* | 11/2003 | Gady et al. | 180/197 |
| 6,702,057 B1* | 3/2004 | Bartel | 180/292 |
| 6,713,990 B1* | 3/2004 | Giraud et al. | 322/23 |
| 6,729,114 B1* | 5/2004 | Fillman et al. | 56/10.6 |
| 6,736,227 B1* | 5/2004 | Huang et al. | 180/65.2 |
| 6,808,033 B1* | 10/2004 | Dare-Bryan | 180/65.6 |
| 6,808,052 B1* | 10/2004 | Kirkwood et al. | 192/35 |
| 6,823,954 B1* | 11/2004 | Shimabukuro et al. | 180/65.2 |
| 6,979,913 B1* | 12/2005 | Storm et al. | 290/17 |

OTHER PUBLICATIONS

AuraGen Induction Power Source Catalog, Aura Systems, Jan. 17, 2003, Section 2.

AuraGen Induction Power Source Catalog, Aura Systems, Jan. 17, 2003, Section 3.

"Frequently Asked Questions" Harrison Hydra-Gen Website, Jan. 17, 2005.

* cited by examiner

VEHICLE MOUNTED ELECTRICAL GENERATOR SYSTEM

This application is a divisional application of prior U.S. application Ser. No. 10/783,266, filed on Feb. 20, 2004 now U.S. Pat. No. 6,979,913.

The present invention relates to electrical generators and more specifically to electrical generators for use in vehicles.

BACKGROUND OF THE INVENTION

There has been a long-felt need for an AC electrical power source in locations not served by electrical utilities. Usually these involve construction sites where the electrical power grid is not yet extended to an individual site. In addition, there are sites that are so remote that electricity is not available.

Typically, AC power generated by a vehicle has been accomplished y the use of inverters which take DC voltage, step it up to well above 240 volts and then electronically manipulate the DC signal so that some form of AC signal at either 120 volts or 240 volts is provided at an outlet box. The system shown in U.S. Pat. No. 6,157,175 is typical of such systems. These involve an alternator positioned in or near the engine compartment and driven off of an accessory belt drive. The alternator generates DC voltage which is then electronically boosted and then chopped to produce a pseudo-AC wave. The problem with devices of this type is significant expense associated with the alternator itself and the complex electrical control system used to produce the pseudo-AC wave output. Furthermore, such systems are relatively incapable of sustaining maximum or above maximum output for any length of time and lack reserve capacity to achieve really heavy-duty current output as when an arc welder or other electrical power-consuming device is utilized with the system.

SUMMARY

The above invention relates to a vehicle-mounted AC electrical generator system where the vehicle includes a prime mover and a compartment for the prime mover. An AC electrical generator is positioned outside said prime mover compartment and has a mechanical power input connection for driving the AC electrical generator to produce electricity. The device receives mechanical power from the prime mover and transfers the mechanical power to the AC electrical generator mechanical power input connection.

In another form, the invention relates to a method of adding an AC electrical generator to a vehicle having a support frame and powered by a prime mover located in a prime mover compartment. The method comprises the steps of mounting the AC electrical generator outside the prime mover compartment and in an available location in the support frame. A mechanical connection is provided between the prime mover and the AC electrical generator.

DESCRIPTION OF THE SELECTED EMBODIMENT

For the purposes of promoting an understanding of the principles of the invention, reference will now be made to the embodiments illustrated herein and specific language will be used to describe the same. It will nevertheless be understood that no limitation of the scope of the invention is thereby intended. Any alterations and further modifications in the described processes, systems or devices, and any further applications of the principles of the invention as described herein, are contemplated as would normally occur to one skilled in the art to which the invention relates.

Figure 1:
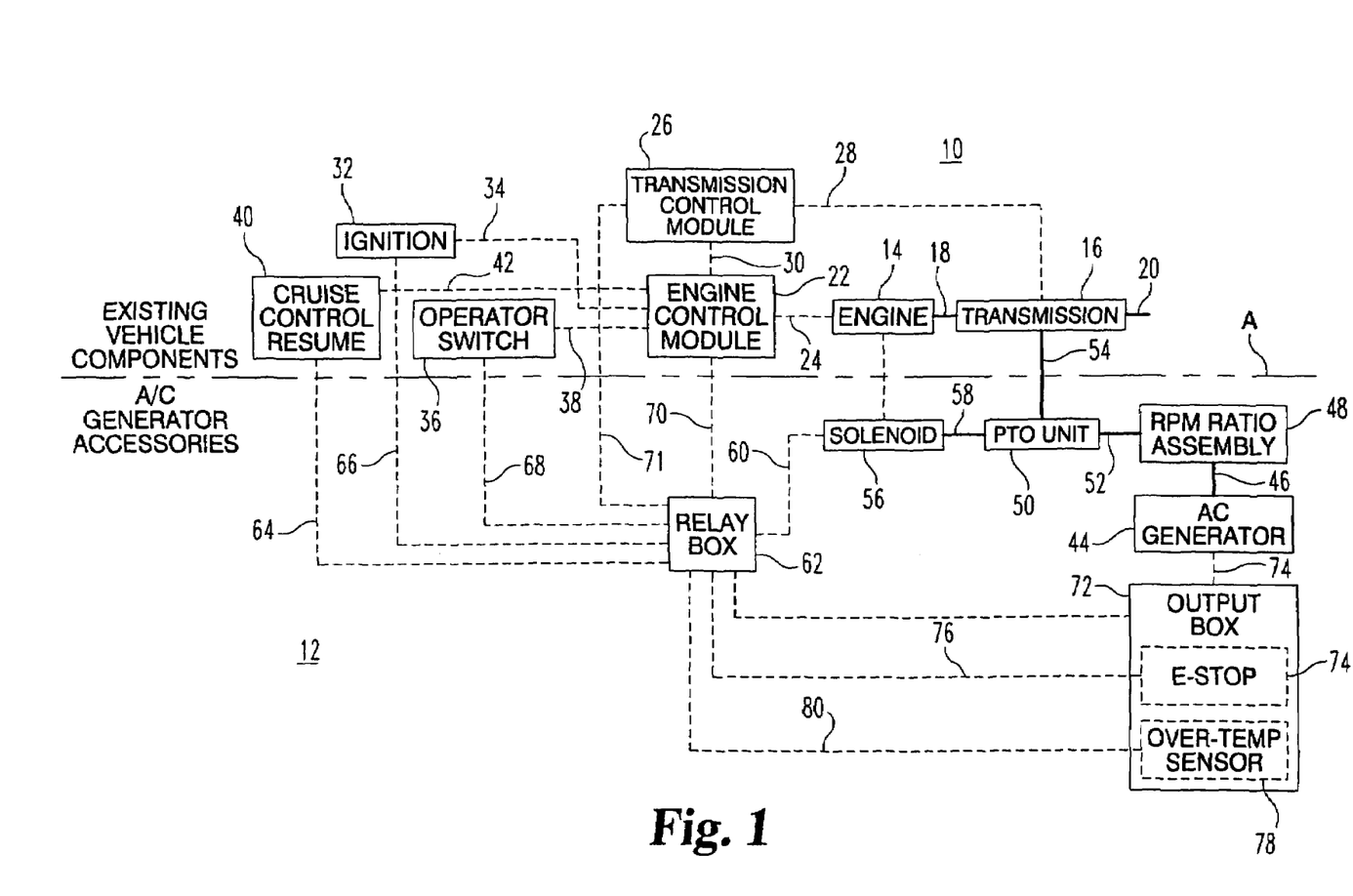
FIG. 1 is a schematic drawing of a vehicle and an AC electrical generator system embodying the present invention.

FIG. 1 shows a vehicle system 10 with which an AC electrical generating system is incorporated. The existing vehicle components and AC generator accessories are demarked by a reference line A. The vehicle 10 has a frame, not illustrated in FIG. 1, but illustrated in FIG. 4 through FIG. 8, which provides a support for a vehicle body, also not shown, and an engine 14 driving a transmission 16 through a primary mechanical output 18 to function as a prime mover for vehicle 10.

Engine 14 may be any one of a variety of prime movers including spark-ignited gasoline or natural gas fueled engine or a compression ignition diesel engine. It should be apparent to those skilled in the art that other forms of prime movers providing mechanical outputs may be incorporated. The transmission 16 may be one of a variety of transmissions herein shown as an automatic transmission providing a rotatable output shaft 20 for the vehicle 10.

The engine 14 is controlled by an engine control module (ECM) 22 interconnected to engine 14 at 24. The interconnection between engine control module 22 and engine 14 may vary widely according to the type of engine and the desired control parameters. In most cases, the engine fuel supply system (not shown) is controlled by a computer in the (ECM) 22 in accordance with an algorithm based on various engine operating parameters such as engine RPM, required torque, ambient temperatures, absolute pressure and a host of other variables. The result is that the interconnection between the engine control module 22 and engine 14 through 24 is a two-way connection wherein parameter signals are transmitted to the ECM and control signals are transmitted to the engine 14.

In a number of vehicles, the transmission 16 has a more sophisticated control through a transmission control module 26 interconnected to transmission 16 through 28 and connected to engine control module 22 through 30. The transmission control module 26, ECM 22, engine 14 and transmission 16 are all coordinated so that the appropriate balance of required power, fuel economy and emissions level is maintained.

In addition to the transmission control module 26, the vehicle 10 has an ignition switch 32 connected to ECM 22 by line 34. The vehicle 10 also has an operator's switch 36 connected to ECM 22 by line 38 for controlling the power takeoff (PTO) described later. In addition, the vehicle 10 has a cruise control resume switch 40 connected to the ECM 22 by line 42. In order to simplify the description of the present invention, the vehicle elements generally described by reference character 10 will be given the same reference characters in FIG. 2 and FIG. 3 even though the AC power generation system will have different elements cooperating with the vehicle components.

The present invention consists of applying a readily available, highly commercially developed and relatively inexpensive AC generator to a vehicle instead of the overly complicated DC generators and inverters previously applied to such vehicles. The elements set forth below allow this to be achieved in a way that is consistent with heavy-duty electrical generation and convenience and safety of use. The AC generator system generally indicated by 12 comprises an AC generator 44 that can be selected from various sizes and manufacturers. Measured in kilowatt output, it has been found that 5–15 kilowatts are readily accommodated within vehicles as set out below. It should be apparent to those skilled in the art, however, that many other AC generators could be employed for this purpose. One of the advantages of an AC generator is that it produces a perfect sine wave which replicates the sine wave produced by utility companies as opposed to the modified or mock sine wave produced by standard inverters on the market. It is also a feature of AC generators that they are very robust and can easily handle high continuous current loadings as would be experienced in typical construction site activities like welding and heavy-duty cutting of materials.

The AC generator 44 is positioned in the vehicle outside of the compartment for the prime mover consisting of the engine and transmission as will be described in detail later. The AC generator has a mechanical power input 46 which is adapted to receive a rotatable input from an RPM ratio assembly. Assembly 48 is connected to a PTO unit 50 via an appropriate mechanical link such as a shaft 52. PTO unit 50 is driven from transmission 16 through an engageable and disengageable mechanical connection 54. A solenoid 56 mechanically connects with PTO unit 50 through a connection 58 to engage or disengage PTO unit 50 and thus drive the AC generator 44 as will be described later.

Solenoid 56 is of a type that is biased to a disengaged position in the absence of an electrical signal and then urged to an engaged position when an electrical signal is sent to solenoid 56 via line 60. Line 60 is connected to a relay box 62 which enables engagement of solenoid 56 and therefore mechanical operation of AC generator 44 only when certain conditions exist. The relay box receives input from the cruise control resume button 40 via line 64 and from ignition switch 32 via line 66. Finally, the relay box receives an input from operator switch 36 via line 68, and from ECM 22 via line 70, and from the transmission control module via line 71.

The electrical output of AC generator 44 extends to output box 72 via power line 74. Output box 72 has usual electrical receptacles. In addition, output box contains an emergency stop switch 74 having a line 76 which connects with relay box 62. In addition, output box 72 has an over-temperature sensor 78 also connected to relay box 62 by means of a line 80.

The AC generator system 12 disclosed above takes advantage of the fact that the ECM 22 accurately controls the RPM of engine 14 under a variety of circumstances including conditions where the engine control module maintains a preselected RPM. In certain vehicles having the capability to connect a power takeoff unit or PTO, there is a feature within the ECM 22 and transmission control module 26 known as the PTO program. The PTO program dictates the prime mover to operate at an RPM that is maintained essentially constant but at a level higher than the normal RPM of the vehicle when it is operating at normal idle. For example, if the normal idle of a vehicle is under 1,000 RPM, the PTO program controls to 1,150 RPM. The drive ratio in housing 48 is selected so that the RPM of the AC generator 44 would be at its optimum to replicate a utility sine wave. Generally speaking, the AC generator's optimum RPM is 3600 for 60 cycles AC in the U.S. and 3000 RPM for 50 cycles found outside of the U.S. Thus the RPM of the generator 44 is extremely accurately controlled by virtue of the governing aspect of the engine control module 22 which varies the quantity of fuel delivered to the engine 14 to account for variations in mechanical load when the electrical loads through output box 72 are varied.

As pointed out before, relay box 62 plays a key role in enabling operation of solenoid 56 so that the AC generator system is only operated when conditions are safe. Thus the following conditions must exist before solenoid 56 can be engaged: (1) automatic transmission in park as sensed through line 71, (or if a manual transmission, in neutral with vehicle parking brake set), (2) operator switch 36 on as sensed through line 68, (3) ignition switch 32 on as sensed through line 66. When these are present, the solenoid is engaged and when the ignition switch 32 is turned to start the engine 14, the solenoid 56 engages the PTO unit 50 to drive AC generator 44. The cruise control resume switch 40 or PTO set position on the operator switch 36 is activated to place the engine 22 in the PTO program for optimum operation of the AC generator 44. The AC generator 44 supplies electrical power through the output box 72. This continues until either: (1) the operator switch 36 is turned off, (2) the ignition switch 32 is turned off, (3) the emergency switch 74 in output box 72 is activated, or (4) the over-temperature sensor 78 indicates too high a temperature through output box 72. Thus it is seen that the AC generator system efficiently utilizes existing sophisticated controls in the vehicle 10 to produce highly accurate and rugged electrical energy. It should be also noted that for vehicles having automatic transmissions with a PTO, the lock-up switch in the transmission is activated when the PTO is engaged. Accordingly, the responsiveness of the ECM to RPM variations due to load is greatly enhanced, thereby enabling an accurate regulation of RPM.

It should also be noted that the mechanical input into the generator 44, while shown as coming from the PTO, may be also derived from any convenient accessory output of the engine including accessory gear boxes, accessory belt drives and the like.

The system shown in FIG. 1 contemplates a mechanical connection described later between the transmission PTO unit 50 and the input to the AC generator 14. The system shown in FIG. 2 employs a hydraulic drive, generally indicated by reference character 82, which is interconnected to the vehicle 10 by a mechanical connection 84 from engine 14 to a hydraulic pump 86. It should be noted that the mechanical input from 84 may either be an accessory gear drive or belt drive or even a PTO depending upon the particular engine/transmission combination. In any event, the mechanical input 84 rotates hydraulic pump 86 to supply fluid under pressure through line 88 past adjustable flow control 90 to hydraulic motor 92 which has as its output the mechanical input 46 to the AC generator 44. A return line 94 extends to a hydraulic reservoir 96 having a feed line 98 to hydraulic pump 86.

Figure 2:
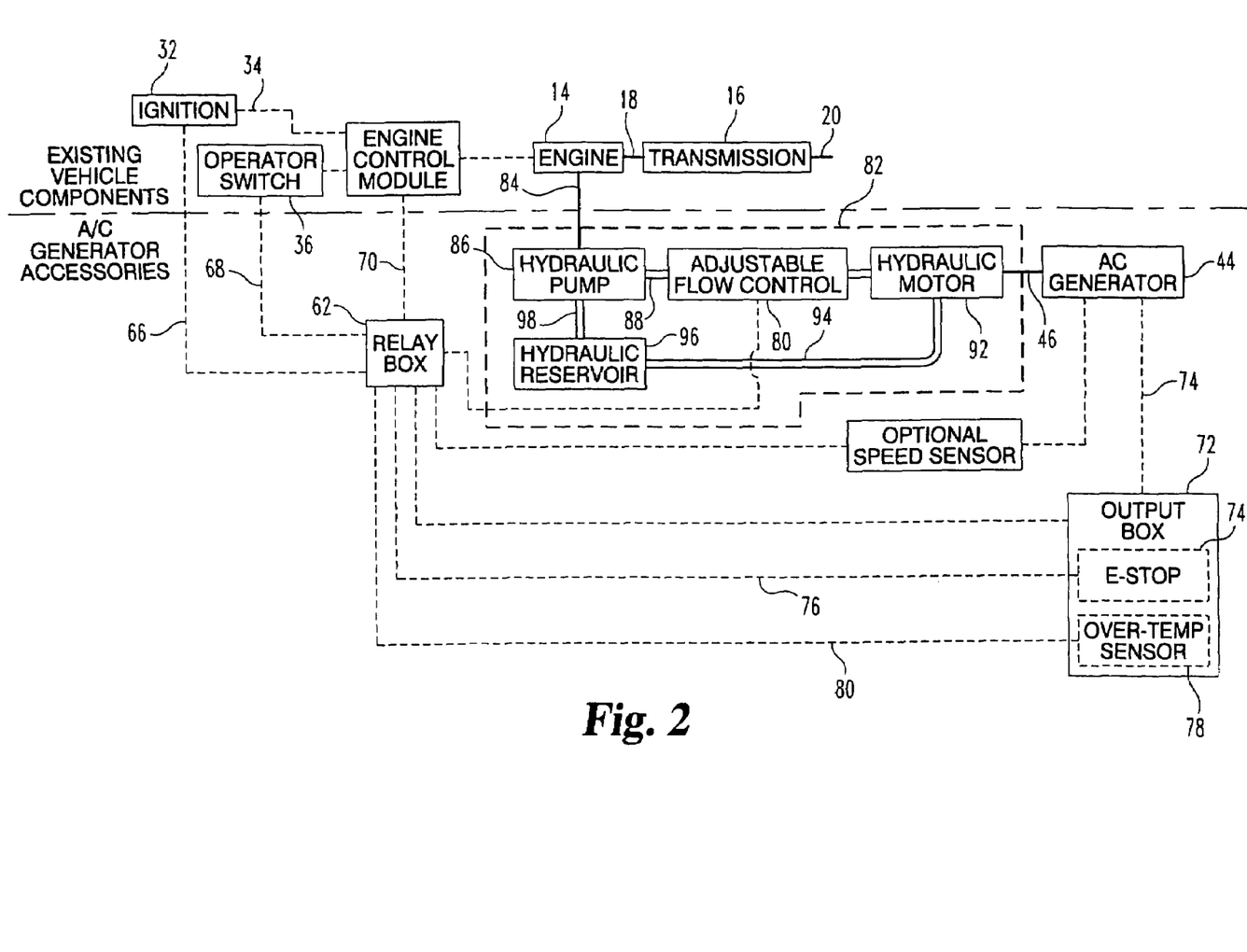
FIG. 2 is a schematic diagram of another electrical generator system for providing AC electrical generation capacity when a vehicle is stationary.

Details of the hydraulic drive 82 will not be discussed in order to aid in an understanding of the present invention. However, typical hydraulic drives may consist of a gear pump 86 having its output regulated by an adjustable flow control 80 to a gear motor 92 having an output RPM controlled by flow as regulated by flow control 80. Alternately, hydrostatic drives involve multi-piston hydraulic pumps and corresponding multi-piston hydraulic motors. The translatory movement of the pistons is translated into rotary movement by virtue of a wobble plate. Variations may come in the form of flow control or mechanical variations in the components in order to provide a predetermined RPM ratio between the output of the engine 14 and the input to the AC generator 44.

As in the case with the system set forth in FIG. 1, the adjustable flow control 90 is set to produce an RPM ratio that takes into account the preselected engine RPM and the required RPM for the AC generator.

The enablement features of relay box 62 are similar to those for FIG. 1 depending upon the engine transmission interconnections and controls.

Figure 3:
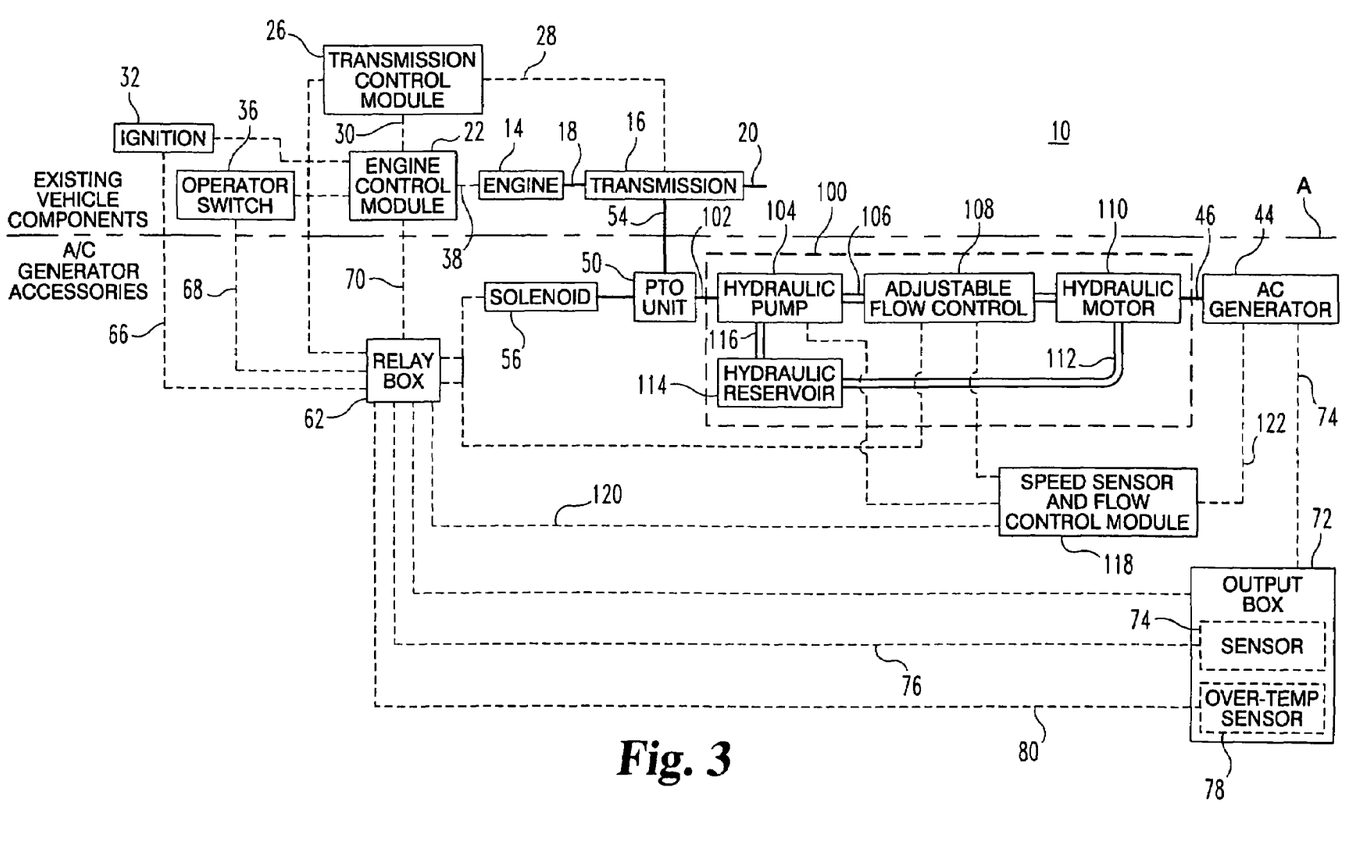
FIG. 3 is a schematic diagram showing an alternate embodiment of the present invention adaptable for provision of electrical power while a vehicle is moving.

Still another variation in the generator control system 12 is found in FIG. 3 wherein a hydraulic drive is adapted to control the AC generator when the vehicle 10 is operated on the highway with varying RPMs from output shaft 20. In this case, a hydraulic drive 100 is connected between an output shaft 102 of the PTO 50 and the input shaft 46 to the AC generator. Hydraulic drive 100 comprises a hydraulic pump 104 driven by input shaft 102 and supplying fluid through line 106 via adjustable flow control 108 to hydraulic motor 110 which has its output connected to input shaft 46 for AC generator 44. A return line 112 extends to a hydraulic reservoir 114 and in turn has a feed pipe 116 to the hydraulic pump 104. Additionally, the hydrostatic drive 100 has a speed sensor and flow control module 118, which acts to vary the RPM ratio between the PTO unit and the drive to the AC generator. Speed sensor 118 receives engine RPM (and therefore vehicle speed) inputs via line 120 extending to relay box 62 and to the engine control module 70. The details of how this operates will not be discussed to simplify an understanding of the present invention. However, it is sufficient to say that the speed sensor and flow control module 18 varies the RPM ratio between the PTO unit and the input shaft 46 to AC generator to maintain a specific RPM from AC generator 44 as sent to the speed sensor 118 via line 122. This preselected RPM is maintained regardless of the variation in RPM of engine 14 and transmission 16.

Figure 4:
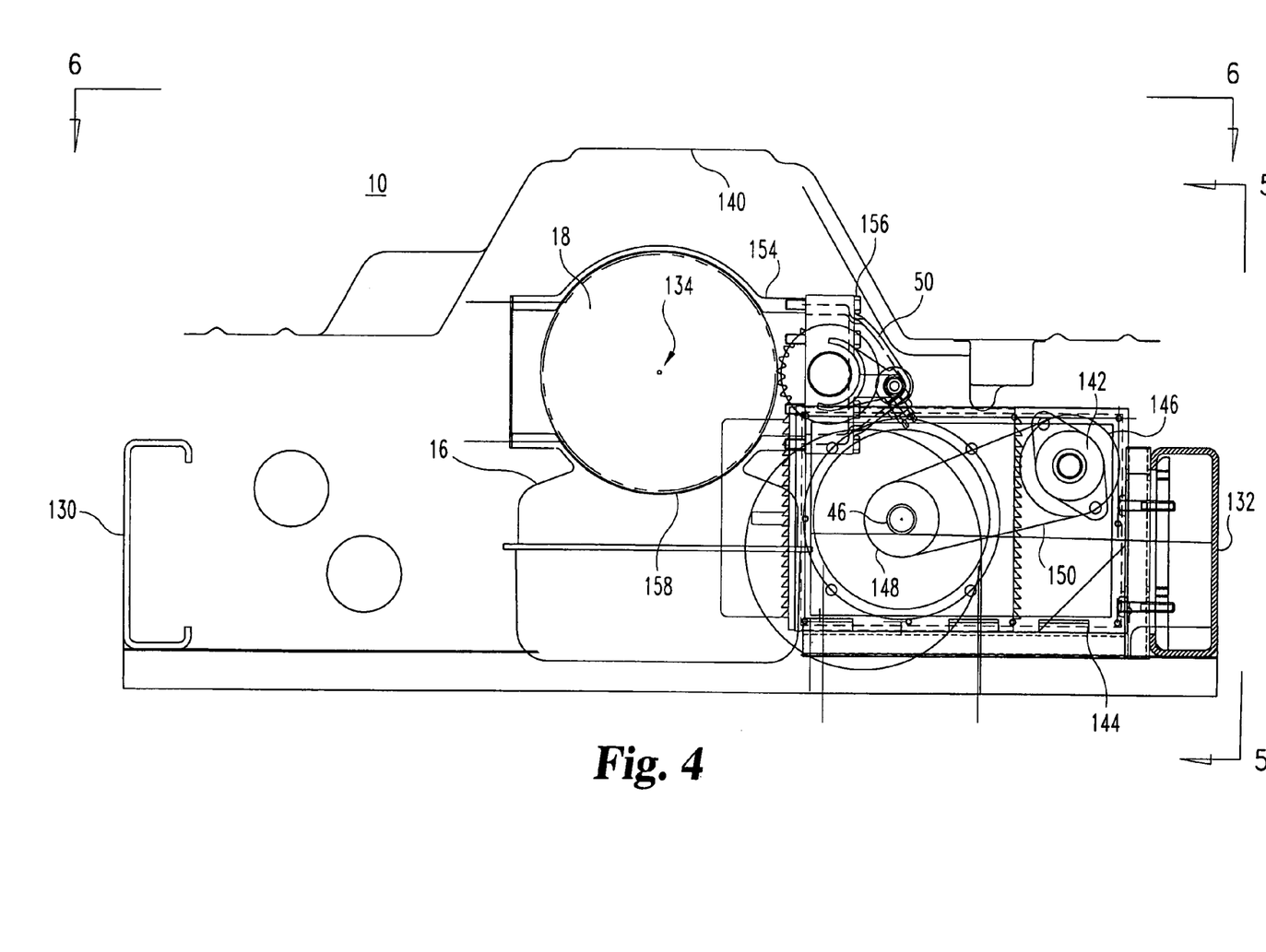
FIG. 4 is a partial view of a vehicle in which the AC electrical generating system is installed looking from the front toward the aft section of the vehicle.

What has been described above is how the generator system of the present invention integrates with the operational control and safety system of the vehicle 10. Reference is now directed to FIGS. 4 through 8 which show a specific implementation of the system described in FIG. 1. FIGS. 4 though 8 show only those portions of the vehicle 10 necessary to properly explain the present invention. All the other details have been omitted to allow a simplification and focus on a proper understanding of the invention.

Vehicle 10 has a pair of frame rails 130 and 132. The frame rails 130 and 132 are generally parallel and form the structural support for many commercial vehicles. Within the frame rails 130 and 132, the engine 14 (not shown) is mounted in such a way that its crankshaft axis identified at 134 is generally parallel to the longitudinal axis of the frame rails 130 and 132. It should also be noted, however, that the engine center line may be oriented other than as shown and still achieve the benefits of the present invention. The transmission 16 is secured to the engine so that the input face 18 to the transmission 16 is coaxial with the axis 134 of the engine. The primary power output from the engine transmission 16 is not shown in order to simplify an understanding of the present invention. It should be apparent to those skilled in the art that it will drive a differential axle at the rear of the vehicle. In addition, it may have an additional output to provide all-wheel-drive by connecting to a similar differential or drive arrangement at the front of the vehicle. As herein shown, the transmission 16 is an automatic manufactured by Allison Division of General Motors. It should be apparent that other transmission brands may be used with equivalent advantage. Transmission 16 has a power takeoff or PTO 50 which has a standard SAE 6 or 8 bolt mounting plate configuration that is equivalent for all commercially available transmissions.

Figure 5:
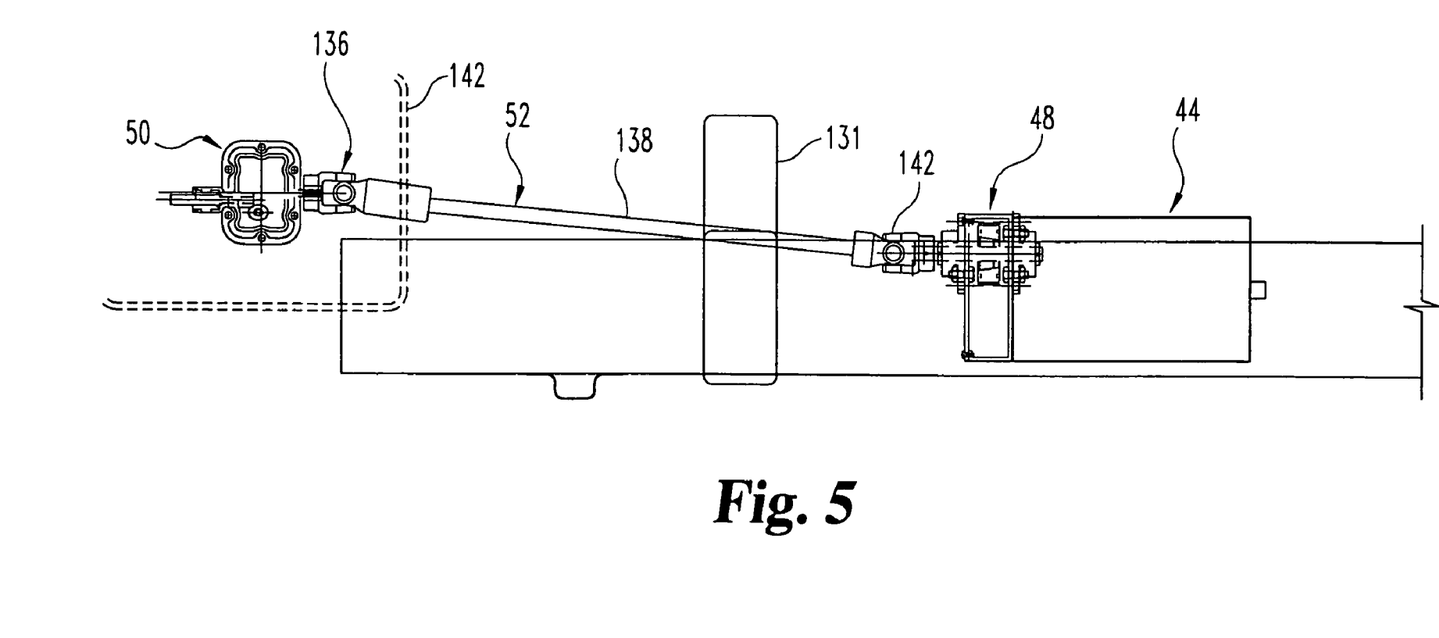
FIG. 5 is a side fragmentary view of the vehicle of FIG. 4 taken on lines 5—5 of FIG. 4.

As shown particularly in FIG. 5, PTO 50 has a universal joint 136 at its output which connects to a torque tube 138 extending aft from vehicle compartment 140 substantially housing the prime mover consisting of the engine 14 and transmission 16. The prime mover compartment 140 is shown in solid outline in FIG. 4 and in dashed outline in FIG. 5. The torque tube 138 extends to a universal joint 142 forming the input to an RPM ratio device 48 that connects to AC generator 44. As shown particularly in FIG. 4, RPM ratio device comprises a housing 144 having journaled therein an input pulley 146 and output pulley 148. Output pulley 148 is fixed to the input 46 to AC generator 44. Input shaft 46 is a shaft and pulley 148 is secured to the shaft in normal fashion. A belt 150 extends between pulleys 146 and 148. The belt 150 is shown as a toothed belt to provide increased torque carrying capacity. It should be noted, however, that a non-toothed belt and other forms of RPM ratio manipulation may be employed with equivalent advantages. Specifically, intermeshing gears may also be employed for this application. As mentioned in the discussion of FIG. 1, the ratio between the power takeoff output RPM and the required input of AC generator 44 is selected to match the optimal RPM conditions for AC generator 44. This is done by selecting the diameters of pulleys 148 and 146 to achieve the required RPM.

Figure 7:
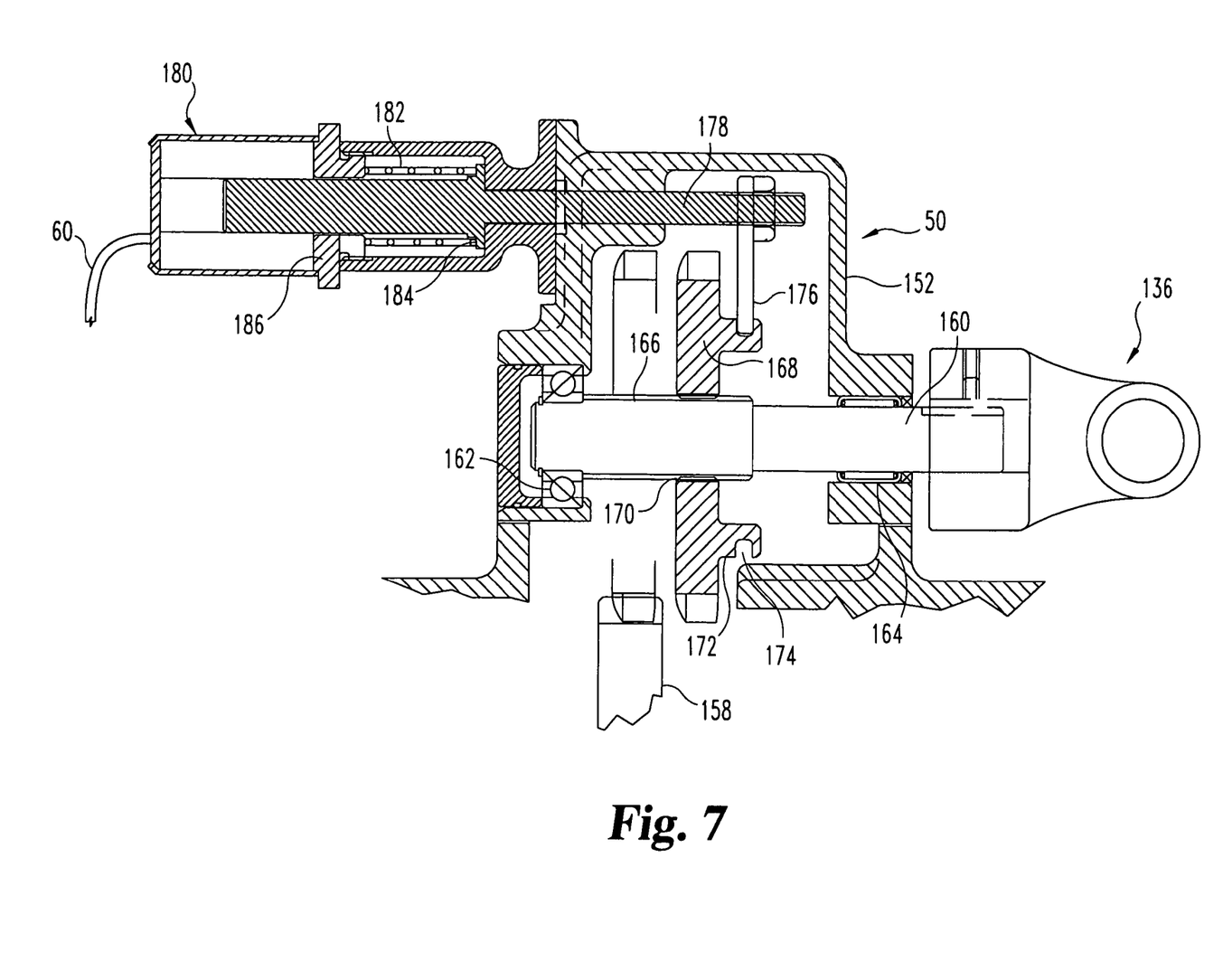
FIG. 7 is a greatly enlarged longitudinal fragmentary section view of a power takeoff (PTO) shown in FIG. 4 and taken on lines 7—7 of FIG. 4.

The PTO 50 is shown as being engageable and disengageable with the output of transmission 16. FIG. 7 shows one implementation of this feature. A housing 152 is secured to the transmission housing 154 by appropriate screws 156 (see FIG. 4). Housing 152 is positioned over a transmission PTO drive gear 158 shown in FIG. 7 and in FIG. 4. An output shaft 160 is journaled in housing 152 by appropriate bearings 162 and 164 to journal shaft 160 on an axis parallel to the axis 134 of the engine 14 and transmission 16. The end of shaft 160 extending from housing 152 connects with universal joint 136. Shaft 160 has an elongated splined section 166 on which a spur gear 168 is telescoped. Spur gear 168 has internal splines 170 which cause gear 168 to rotate with shaft 160 but permits it to be axially displaceable from the solid position shown in FIG. 7 where the AC generator is disengaged from the prime mover to the left-most position indicated by partial lines in FIG. 7 where the AC generator is engaged with the prime mover. Spur gear 168 has an integral extension 172 and groove 174 which receives a fork 176. Fork 176 is secured to the moveable output shaft 178 of a solenoid 180. Output shaft 178 of the solenoid 180 is biased to its solid position shown in FIG. 7 by a spring 182 acting against a flange 184 on shaft 178 and an end wall 186 in solenoid 180. Solenoid 180 then holds the gear 168 in its disengaged position by virtue of the spring and when electrical power is applied to solenoid 180 by line 60, the output shaft 178 is displaced to the left as shown in FIG. 7 thus meshing gear 168 with the transmission accessory drive gear 158 to cause the AC generator to be operated. It should be noted particularly in FIG. 4 that housing 152 of PTO 50 has an angled outer configuration so as to clear the existing wall of prime mover compartment 140. This is particularly advantageous for applications where the PTO is desired to be taken off of a side of the transmission opposite to the provision made by the original equipment manufacturer.

Figure 8:
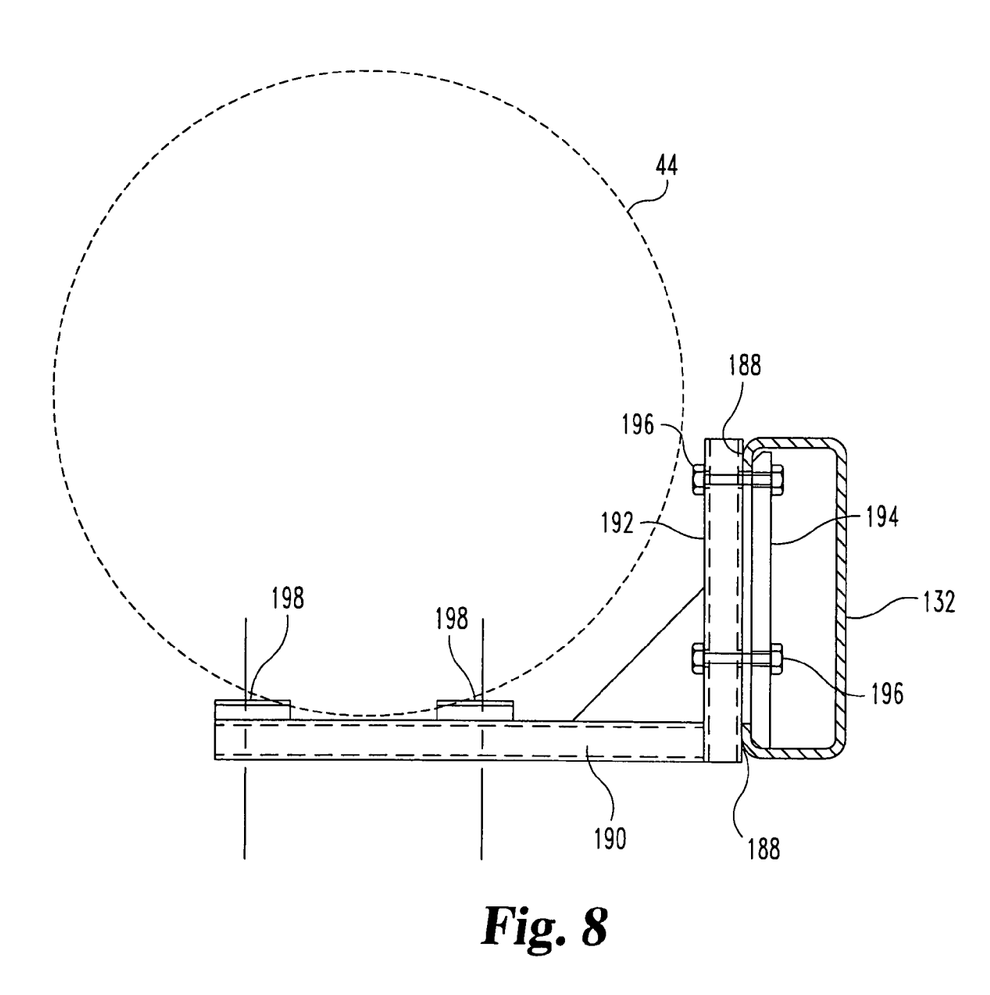
FIG. 8 is an enlarged side view of an AC electrical generator mounting assembly used to support the AC generator shown in FIGS. 4 through 6.

As pointed out earlier, the AC generator 44 is positioned at a point substantially outside of the prime mover compartment 140. In vehicles of this type, it is common to have frame rails. The brackets shown in FIG. 8 show in detail how the AC generator 44 and RPM ratio device 48 may be mounted in the vehicle frame without having to drill holes or otherwise cut into the structural integrity of the frame rails. As shown particularly in FIG. 8, frame rail 132 from which the AC generator 44 will be mounted has a C-shaped cross-section with lips 188 extending toward one another. The bracket for mounting the AC generator 44 and RPM ratio device 48 comprises a pair of fingers 190 extending from vertical brackets 192 and in a direction generally at right angles to the axis of rotation of AC generator 44. Brackets 192 extend vertically beyond the upper and lower extent of frame 132 and connect to plates 194 by means of fasteners 196 to sandwich the lips 188 of frame rail 132. A pair of longitudinal support plates 198 interconnect brackets 190 and provide a mounting platform for the AC generator 44. It should be noted that because the frame 132 is generally of uniform cross-section, the vertical brackets 192 and plates 194 may be easily positioned in an optimal location along frame rail 132 to provide optimum positioning of AC generator where a space is available within the frame of the vehicle 10. It should be noted that in practice the space within the frame of the vehicle is usually crowded with a significant number of components including the main drive shaft to the rear axle, the catalytic converter and muffler and appropriate interconnecting exhaust pipe. In addition, items like a fuel tank could be contained within the frame. By clamping the mounting for the AC generator in the manner described above, greater flexibility is realized to fit the AC generator 44 into an appropriate location.

Figure 6:
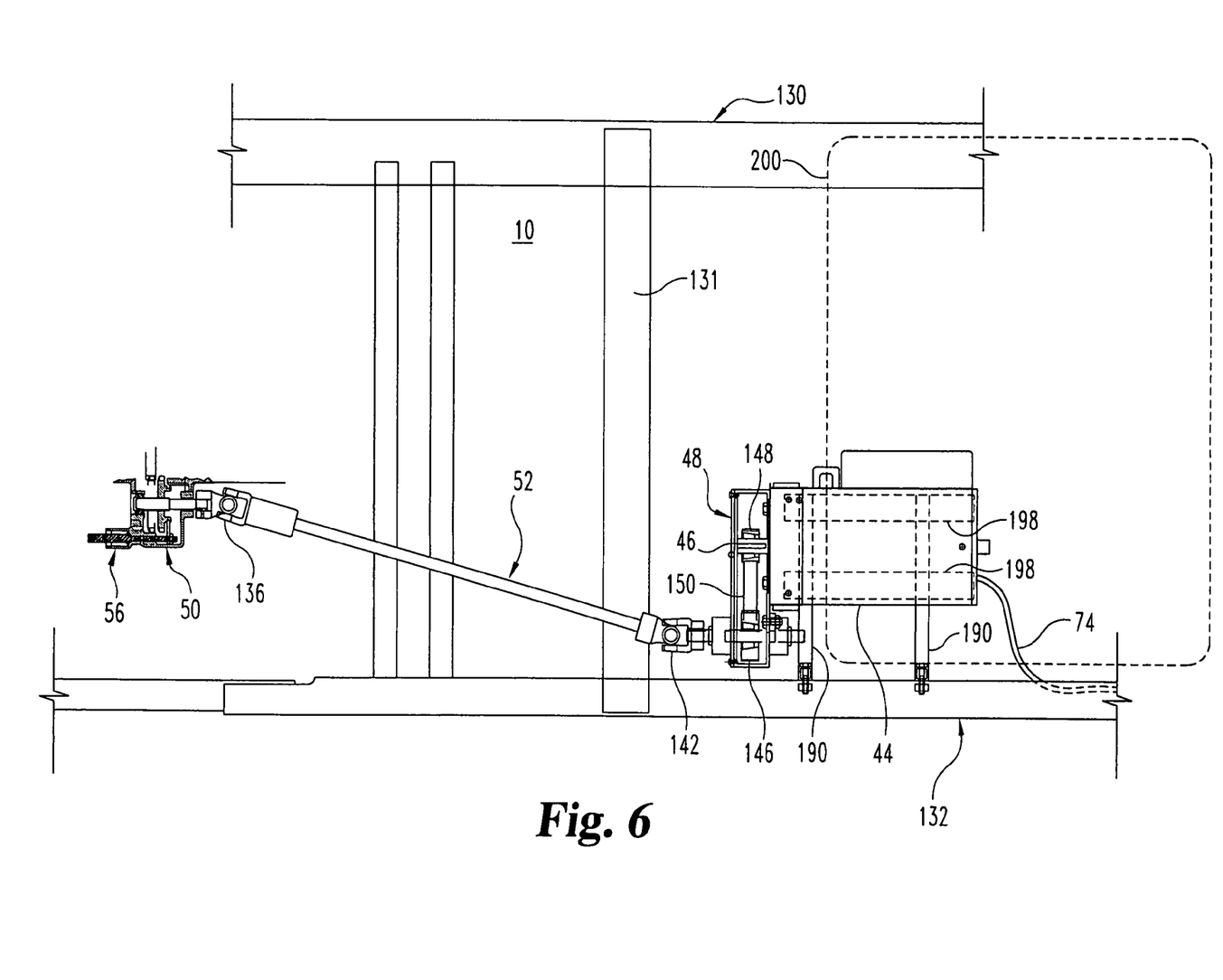
FIG. 6 is a plan view of the system of FIG. 4 taken on lines 6—6 of FIG. 4.

As shown particularly in FIG. 6, the electrical output from AC generator 44 through line 74 extends from AC generator 44 through the frame 132 to the output box 72 (not shown in FIG. 6). However it should be noted that at least a portion of the electrical line 74 extends through frame 132 for added protection as it extends to outlet box 72.

Also with reference to FIG. 6, the load-carrying portion of vehicle 10 is indicated by dashed lines 200 and it is apparent that the AC generator 44 is contained within the frame adjacent the load carrying section 200. This is advantageous because the outlet box 72 is also positioned in the load carrying section making it convenient to construction equipment and supplies to be used by an operator.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle mounted AC electrical generator system comprising:
   a prime mover controlled by a control system;
   an AC electrical generator positioned in said vehicle and having a mechanical power input connection means to receive power from said prime mover for driving said AC electrical generator to produce electricity,
   a mechanical power transfer means engageable to receive mechanical power from said mechanical power input connection means and to transfer said mechanical power to said AC electrical generator,
   a device operable to engage and disengage said mechanical power transfer means from said mechanical power input connection means.

2. Apparatus as claimed in claim 1 wherein said mechanical power transfer means comprises a power takeoff output having a mechanism for releasably engaging said mechanical power transfer means.

3. Apparatus as claimed in claim 2 wherein:
   said power takeoff output shaft has a driven gear,
   said mechanical power transfer means has a driving gear providing a rotatable output from said mechanical power transfer means and displaceable into and out of engagement with said power output shaft driven gear, and
   said system has a device for displacing said driving gear into and out of engagement with said driven gear.

4. Apparatus as claimed in claim 3 wherein said device for displacing said driving gear is a solenoid receiving an electrical input.

5. Apparatus as claimed in claim 4 wherein said solenoid valve biases said driving gear to a disengaged position in the absence of an electrical signal and to an engaged position in the presence of an electrical signal.

6. Apparatus as claimed in claim 5 wherein said system further comprises a device interconnecting said solenoid to said prime mover control system for the purpose of said power takeoff output in the event certain operating parameters are detected.

7. Apparatus as claimed in claim 1 wherein said engaging and disengaging device is interconnected with the control system for said prime mover to control engagement of said AC electrical generator dependent upon inputs from said control system.

8. Apparatus as claimed in claim 7 wherein said engaging and disengaging device transfers mechanical power to said AC electrical generator when certain operating parameters exist.

9. Apparatus as claimed in claim 7 wherein said vehicle has a further control system for controlling vehicle parameters and wherein said engaging and disengaging device is also responsive to vehicle control parameters to transfer mechanical power to said AC electrical generator.

10. Apparatus as claimed in claim 9 wherein said prime mover has an engine control module, and a transmission control module and wherein said engaging and disengaging device is responsive to electrical control signals, said AC electrical generator system comprising a relay device receiving inputs from said engine control module and said transmission control module for enabling operation of said AC electrical generator when certain control parameters exist in said engine control module and said transmission control module.

11. Apparatus as claimed in claim 7 wherein said engaging and disengaging device disconnects said mechanical power to said AC generator when certain operating parameters are present.

12. Apparatus as claimed in claim 11 wherein said AC generating system has an output box for providing electrical load connection to said AC generator, which has over-temperature protection.

13. Apparatus as claimed in claim 12 further comprising an emergency operation switch to disengage the AC generator from said prime mover.

\* \* \* \* \*